United States Patent
Fergusson et al.

(10) Patent No.: US 8,947,372 B2
(45) Date of Patent: Feb. 3, 2015

(54) ELECTRONIC DEVICE INCLUDING TOUCH-SENSITIVE DISPLAY

(75) Inventors: Andrew Ashraf Fergusson, St. Clements (CA); Bradley James Laflamme, Waterloo (CA); Rene Pierre Marchand, Waterloo (CA)

(73) Assignee: BlackBerry Limited, Waterloo (CA)

( * ) Notice: Subject to any disclaimer, the term of this patent is extended or adjusted under 35 U.S.C. 154(b) by 320 days.

(21) Appl. No.: 12/854,635

(22) Filed: Aug. 11, 2010

(65) Prior Publication Data
US 2012/0038558 A1    Feb. 16, 2012

(51) Int. Cl.
*G06F 3/041*    (2006.01)
*G06F 3/01*    (2006.01)
*G06F 3/0488*    (2013.01)

(52) U.S. Cl.
CPC ............... *G06F 3/041* (2013.01); *G06F 3/016* (2013.01); *G06F 3/0488* (2013.01); *G06F 2203/04105* (2013.01)
USPC .......................................... 345/173; 715/702

(58) Field of Classification Search
USPC ............ 345/173–177, 179; 178/18.01–18.11, 178/19.01; 715/702
See application file for complete search history.

(56) References Cited

U.S. PATENT DOCUMENTS

| | | | |
|---|---|---|---|
| 6,094,457 A | 7/2000 | Linzer et al. | |
| 7,109,976 B2 * | 9/2006 | Cobian | 345/173 |
| 7,148,875 B2 * | 12/2006 | Rosenberg et al. | 345/156 |
| 7,324,094 B2 | 1/2008 | Moilanen et al. | |
| 7,339,572 B2 | 3/2008 | Schena | |
| 7,656,388 B2 | 2/2010 | Schena et al. | |
| 2004/0233161 A1 | 11/2004 | Shahoian et al. | |
| 2006/0022952 A1 * | 2/2006 | Ryynanen | 345/173 |
| 2006/0290662 A1 | 12/2006 | Houston et al. | |
| 2008/0060856 A1 * | 3/2008 | Shahoian et al. | 178/18.03 |
| 2008/0062122 A1 | 3/2008 | Rosenberg et al. | |
| 2008/0252594 A1 | 10/2008 | Gregorio et al. | |
| 2009/0072662 A1 * | 3/2009 | Sadler et al. | 310/319 |
| 2009/0167704 A1 | 7/2009 | Terlizzi et al. | |
| 2010/0156844 A1 | 6/2010 | Paleczny et al. | |

OTHER PUBLICATIONS

Extended European Search Report dated Jan. 31, 2011, issued in respect of corresponding European Patent Application No. 10172552.1.
Examiner's Report dated Jun. 21, 2013, issued from the corresponding Canadian patent application No. 2,745,600.
Examiner's Report dated Feb. 27, 2014, issued from the corresponding Canadian patent application No. 2,745,600.

(Continued)

*Primary Examiner* — Kent Chang
*Assistant Examiner* — Scott Au
(74) *Attorney, Agent, or Firm* — Geoffrey deKleine; Borden Ladner Gervais LLP

(57) ABSTRACT

An electronic device includes a base, a touch-sensitive display moveable relative to the base, piezo actuators disposed between the base and the touch-sensitive display, the piezo actuators including a first piezo actuator and a second piezo actuator spaced from the first piezo actuator, and a controller configured to control the piezo actuators to alternately actuate the first piezo actuator and the second piezo actuator and apply forces to the touch-sensitive display, thereby causing the touch-sensitive display to pivot relative to the base.

7 Claims, 4 Drawing Sheets

(56) References Cited

OTHER PUBLICATIONS

Motorola Droid live review, http://www.cnet.com/8301-19736_1-10385261-251.html, published at least as early as Oct. 28, 2009, 9 pages.

Poupyrev et al., "TouchEngine: A tactile display for handheld devices", Proceedings of CHI 2002, Extended Abstracts, ACM, pp. 644-645, published at least as early as Dec. 2002.

Perkins, "Multi-function piezoelectric transducers for handheld electronics", http://adsabs.harvard.edu/abs/2001spie.4332.480p, Jun. 2001.

* cited by examiner

US 8,947,372 B2

ELECTRONIC DEVICE INCLUDING TOUCH-SENSITIVE DISPLAY

FIELD OF TECHNOLOGY

The present disclosure relates to electronic devices including portable electronic devices having touch screen displays.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
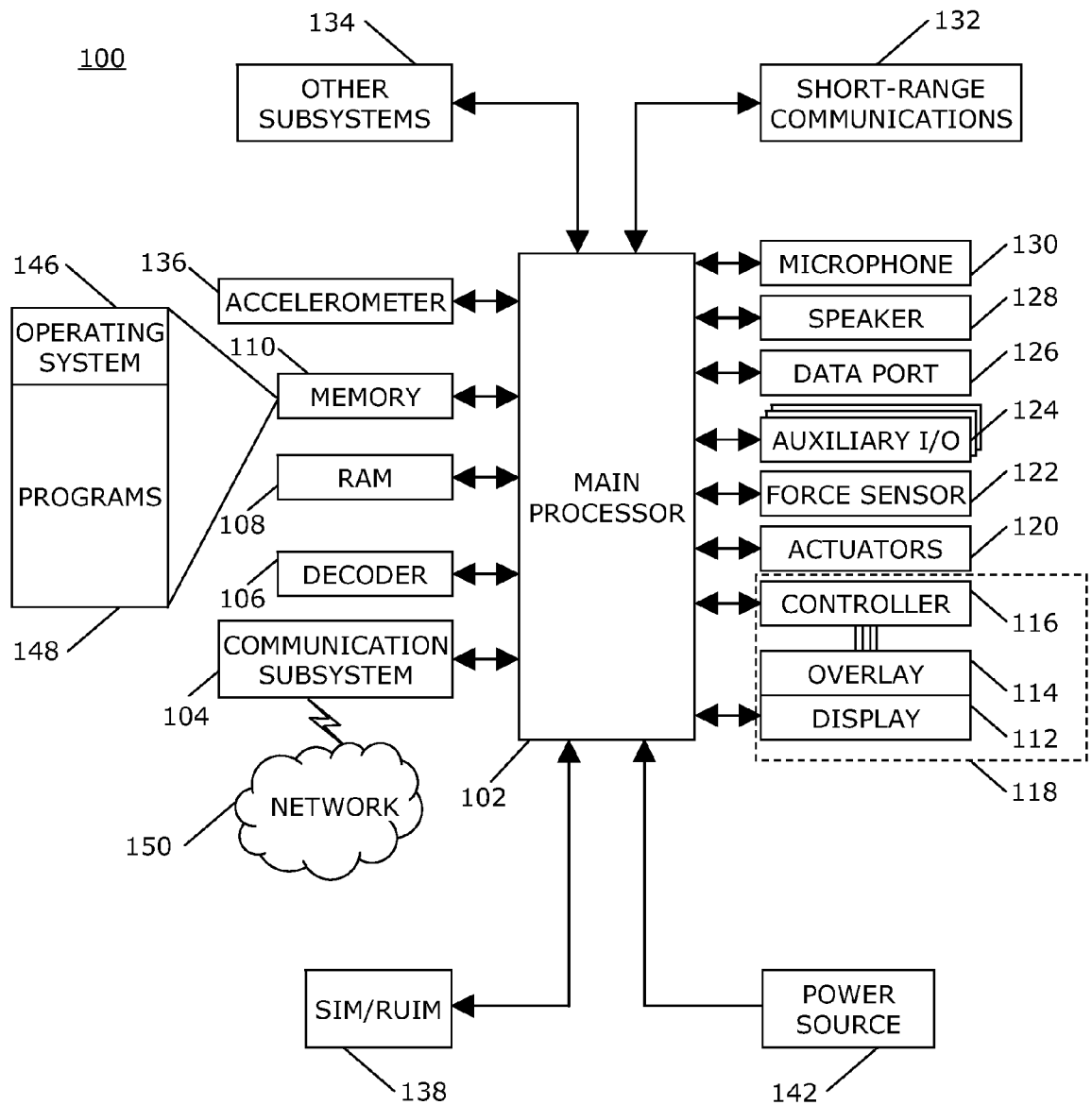
FIG. 1 is a block diagram of an example of a portable electronic device in accordance with the disclosure.

The following describes an electronic device that includes a base, a touch-sensitive display moveable relative to the base, piezo actuators disposed between the base and the touch-sensitive display, the piezo actuators including a first piezo actuator and a second piezo actuator spaced from the first piezo actuator, and a controller configured to control the piezo actuators to alternately actuate the first piezo actuator and the second piezo actuator and apply forces to the touch-sensitive display, thereby causing the touch-sensitive display to pivot relative to the base.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, actuators 120, force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Figure 2:
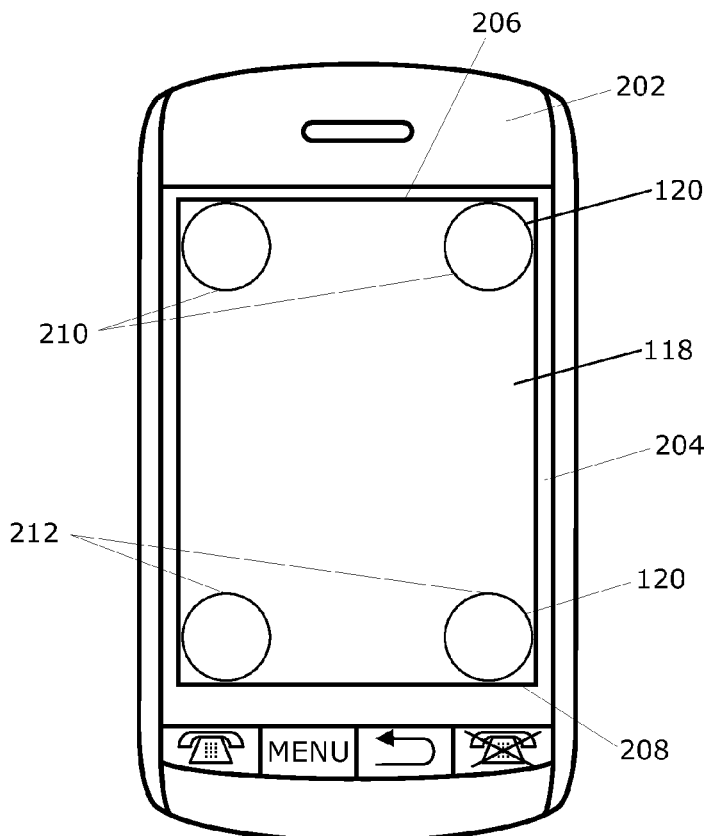
FIG. 2 is a front view of an example of a portable electronic device including actuators in accordance with the disclosure.

A front view of a portable electronic device 100 is shown in FIG. 2. The portable electronic device 100 includes a housing 202 that is suitable for enclosing components shown in FIG. 1. The housing includes a frame 204 around the touch-sensitive display 118. In the example shown in FIG. 2, the actuators 120 comprise four piezoelectric (piezo) actuators, each located near a respective corner of the touch-sensitive display 118. Two piezo actuators 210 are located near a first end 206 of the touch-sensitive display 118 and two piezo actuators 212 are located near a second end 208 of the touch-sensitive display 118.

Figure 3:
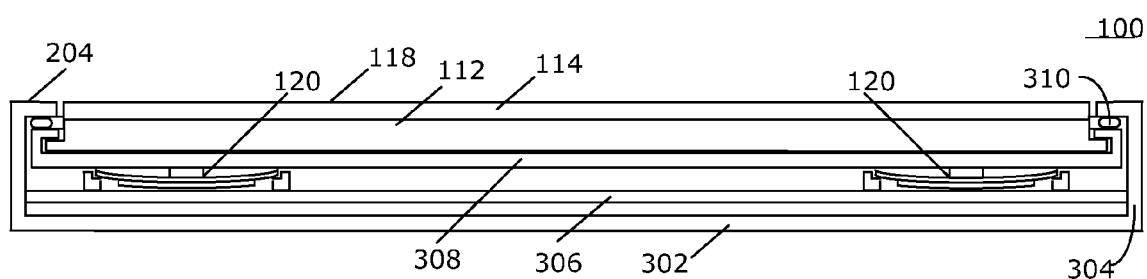
FIG. 3 is an example sectional side view of the portable electronic device, through the actuators shown in FIG. 2, in accordance with the disclosure.

A sectional side view of the portable electronic device 100, through the centers of the piezo actuators 210, 212 is shown in FIG. 3. The housing 202 also includes a back 302 and sidewalls 304 that extend between the back 302 and the frame 204. A base 306 is spaced from and is generally parallel to the back 302. The base 306 may be any suitable base such as a printed circuit board or circuit board supported by one or more supports between the base 306 and the back 302. The touch-sensitive display 118 is supported on a support tray 308 of suitable material, such as magnesium. A compliant gasket 310 may be located between the support tray 308 and the frame 204 to protect the components within the housing 202 of the portable electronic device 100. A suitable material for the compliant gasket 310 includes, for example, a cellular urethane foam with a suitable fatigue life. The compliant gasket 310 may absorb shock and dampen vibration. The compliant gasket 310 may also bias the touch-sensitive display 118, toward the base 306.

Figure 4:
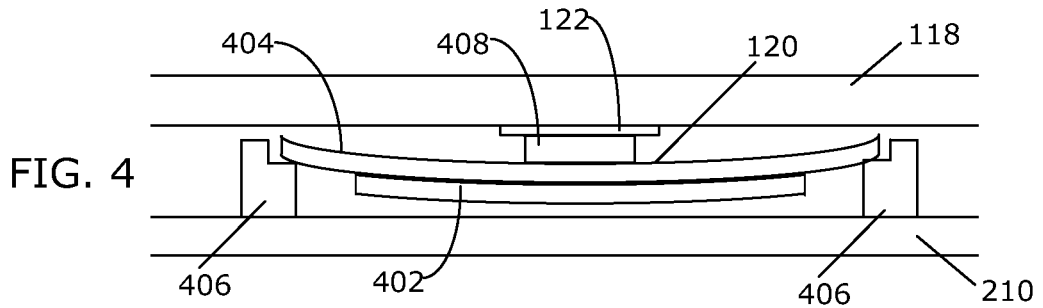
FIG. 4 is a sectional side view of an example of an actuator in accordance with the disclosure.
Figure 5:
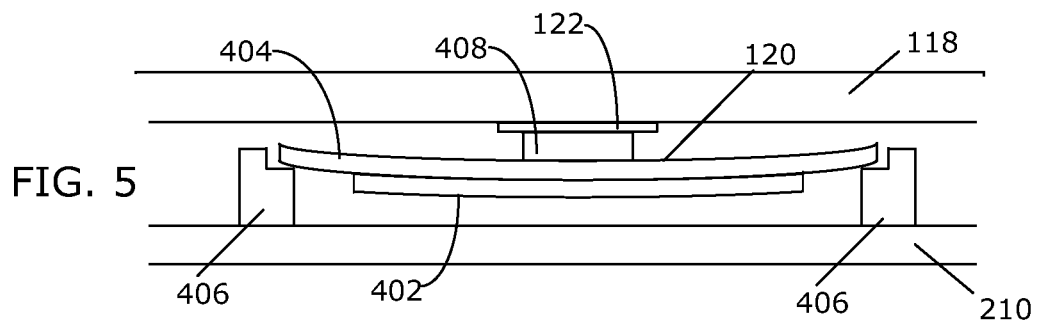
FIG. 5 is a sectional side view of an example of an actuator in accordance with the disclosure.

A cross section taken through the center of one of the piezo actuators 210, 212 is shown in FIG. 4 and in FIG. 5. The piezo actuator 210, 212 may comprise one or more piezo devices or elements 402. The piezo actuator 210, 212 is shown disposed between the base 306 and the touch-sensitive display 118. The piezo actuator 210, 212 includes a piezoelectric element 402, such as a piezoelectric ceramic disk, fastened to a substrate 404, for example, by adhesive, lamination, laser welding, or by other suitable fastening method or device. The piezoelectric material may be lead zirconate titanate or any other suitable material. Although the piezo element 402 is a ceramic disk in this example, the piezoelectric material may have any suitable shape and geometrical features, for example a non-constant thickness, chosen to meet desired specifications.

The substrate 404, which may also be referred to as a shim, may be comprised of a metal, such as nickel, or any other suitable material such as, for example, stainless steel, brass, and so forth. The substrate 404 bends when the piezo element 402 contracts diametrically, as a result of build up of charge at the piezo element 402 or in response to a force, such as an external force applied to the touch-sensitive display 118.

The substrate 404 and piezo element 402 may be suspended or disposed on a support 406 such as a ring-shaped frame for supporting the piezo element 402 while permitting flexing of the piezo actuator 210, 212 as shown in FIG. 4. The supports 406 may be disposed on the base 306 or may be part of or integrated with the base 306, which may be a printed circuit board. Optionally, the substrate 404 may rest on the base 306, and each piezo actuator 210, 212 may be disposed, suspended, or preloaded in an opening in the base 306. The piezo actuator 210, 212 is not fastened to the support 406 or the base 306 in these embodiments. The piezo actuator 210, 212 may optionally be fastened to the support 406 through any suitable method, such as adhesive or other bonding methods.

A pad 408 may be disposed between the piezo actuator 210, 212 and the touch-sensitive display 118. The pad 408 in the present example is a compressible element that may provide a small amount of shock-absorbing or buffering protection and may comprise a suitable material, such as a hard rubber, silicone, and/or polyester, and/or other materials. The pads 408 are advantageously flexible and resilient and may provide a bumper or cushion for the piezo actuator 210, 212 as well as facilitate actuation of the piezo actuator 210, 212. Force sensors 122 may be disposed between the piezo actuators 210, 212 and the touch-sensitive display 118. When the touch-sensitive display 118 is depressed, the force sensors 122 generate force signals that are received and interpreted by the microprocessor 102. The pads 408 are advantageously aligned with force sensors 122 to facilitate the focus of forces exerted on the touch-sensitive display 118 onto the force sensors 122. The pads 408 transfer forces between the touch-sensitive display 118 and the piezo actuators 210, 212 whether the force sensors 122 are above or below the pads 408. The pads 408 facilitate provision of tactile feedback from the piezo actuators 210, 212 to the touch-sensitive display 118 without substantially dampening the force applied to or on the touch-sensitive display 118.

The touch-sensitive display 118 is moveable toward the base 306 as an external force is imparted on the touch-sensitive display 118 and transferred to the piezo actuators 210, 212, as shown in FIG. 4. The touch-sensitive display 118 is also moveable away from the base 306, against the bias of the compliant gasket 310 when sufficient charge across the piezo element 402 causes the piezo element 402 to shrink diametrically and causes the substrate 404 and piezo element 402 to flex, as illustrated in FIG. 5 in which the touch-sensitive display 118 is displaced such that the touch-sensitive display 118 is farther from the base 306 than in FIG. 4. The charge of the piezo elements 402 may be adjusted to control the force applied by the piezo actuators 210, 212 on the support tray 308, and thus the touch-sensitive display 118, to control the resulting movement of the touch-sensitive display 118. The charge may be adjusted by varying the voltage or current to the piezo elements 402. For example, a current may be applied to increase the charge on the piezo elements 402 and increase the force applied by the piezo actuators 210, 212 on the touch-sensitive display 118. The charge on the piezo elements 402 may be removed by a controlled discharge current to decrease the force applied by the piezo actuators 210, 212 on the touch-sensitive display 118.

The force sensors 122 may be disposed between the piezo actuators 210, 212 and the touch-sensitive display 118. In the example of FIG. 4, the force sensors 122 are disposed between the touch-sensitive display 118 and the pads 408. Alternatively, the force sensors 122 may be disposed between the pads 408 and the piezo actuators 210, 212.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 6:
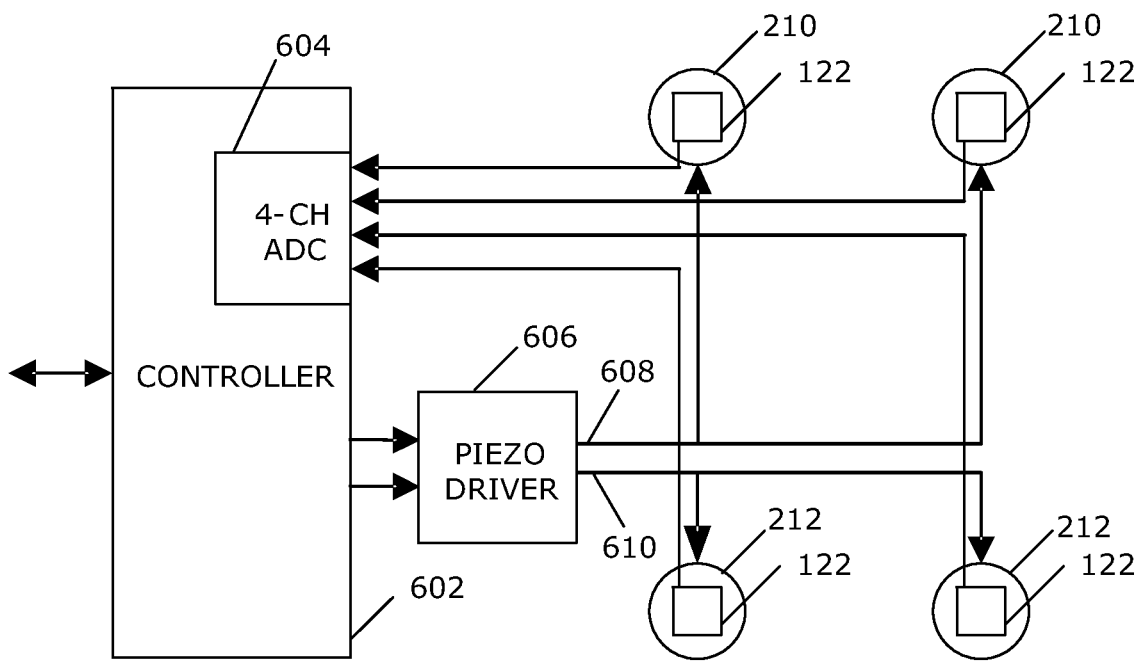
FIG. 6 is an example block diagram including force sensors and actuators of the portable electronic device in accordance with the disclosure.

A simplified block diagram including force sensors and actuators of the portable electronic device 100 is shown in FIG. 6. In this example, each force sensor 122 is electrically connected to a controller 602, which includes an amplifier and analog-to-digital converter (ADC) 604. Each force sensor 122 may be, for example, a force-sensing resistor wherein the resistance changes as force applied to the force sensor 122 changes. As applied force on the touch-sensitive display 118 increases, the resistance decreases. This change is determined via the controller 116 for each of the force sensors 122, and a value representative of the force at each of the force sensors 122 may be determined.

The piezo actuators 210, 212 are electrically connected to a piezo driver 606 that communicates with the controller 602. The controller 602 is also in communication with the main processor 102 of the portable electronic device 100 and may exchange signals with the main processor 102. The piezo actuators 210, 212 and the force sensors 122 are operatively connected to the main processor 102 via the controller 602. The controller 602 controls the piezo driver 606 that controls the current/voltage to the piezo devices 402, and thus the controller 602 controls the force applied by the piezo actuators 210, 212 on the touch-sensitive display 118.

In the Example shown in FIG. 6, two of the piezo actuators 210 are controlled separately of the remaining two piezo actuators 212. In particular, the piezo actuators 210 near the first end 206 of the touch-sensitive display 118 are connected on a high voltage side to a common control line 608 and on a low voltage side to ground. The piezo actuators 210 near the first end 206 of the touch-sensitive display 118 are controlled substantially equally and concurrently by the same signal that is provided through the common control line 608 that extends to each of the two actuators 210 near the first end 206. Similarly, the piezo actuators 212 near the second end 208 of the touch-sensitive display 118 are connected on a high voltage side to a common control line 610 and on a low voltage side to ground. The piezo actuators 212 near the second end 208 of the touch-sensitive display 118 are controlled substantially equally and concurrently by the same signal that is provided through the common control line 610 that extends to each of the two actuators 212 near the second end 208.

The actuators 120 may be controlled to cause vibration of the portable electronic device 100. The piezo actuators 210, 212 may be controlled by application of high voltage to drive the piezo actuators 210, 212 and increase the charge across the piezo actuators 210, 212. The piezo actuators 210, 212 are then discharged to return to the uncharged state or rest position. Each of the piezo actuators 210, 212, may be discharged by a discharge current from the high voltage side of the piezo actuator 210, 212, for example, to ground.

High voltage is applied such that the piezo actuators 210 near the first end 206 of the touch-sensitive display 118 are driven out of phase with the piezo actuators 212 near the second end 208 of the touch-sensitive display 118. Thus, the piezo actuators 210 are charged when the piezo actuators 212 are discharged. Similarly, the piezo actuators 212 are charged when the piezo actuators 210 are discharged.

In the example shown in FIG. 6, the application of high voltage is controlled to alternately actuate the piezo actuators 210 and the piezo actuators 212, thereby causing the touch-sensitive display 118 to pivot relative to the base 306. The touch-sensitive display 118 generally pivots about a center-line of the display, between the first end 206 and the second end 208. Alternate actuation of the piezo actuators 210 and the piezo actuators 212 is controlled to cause vibration of the portable electronic device 100. The piezo actuators 212 may therefore be utilized for tactile feedback as well as vibration, rather than utilizing piezo actuators and a separate vibration motor. The vibration is provided by a rocking motion or pivoting of the touch-sensitive display 118 rather than by a piston-like motion in which the touch-sensitive display 118 moves generally parallel with the base 306. Movement of the touch-sensitive display 118 in the rocking motion results in less noise by comparison to movement in the piston-like motion.

Figure 7:
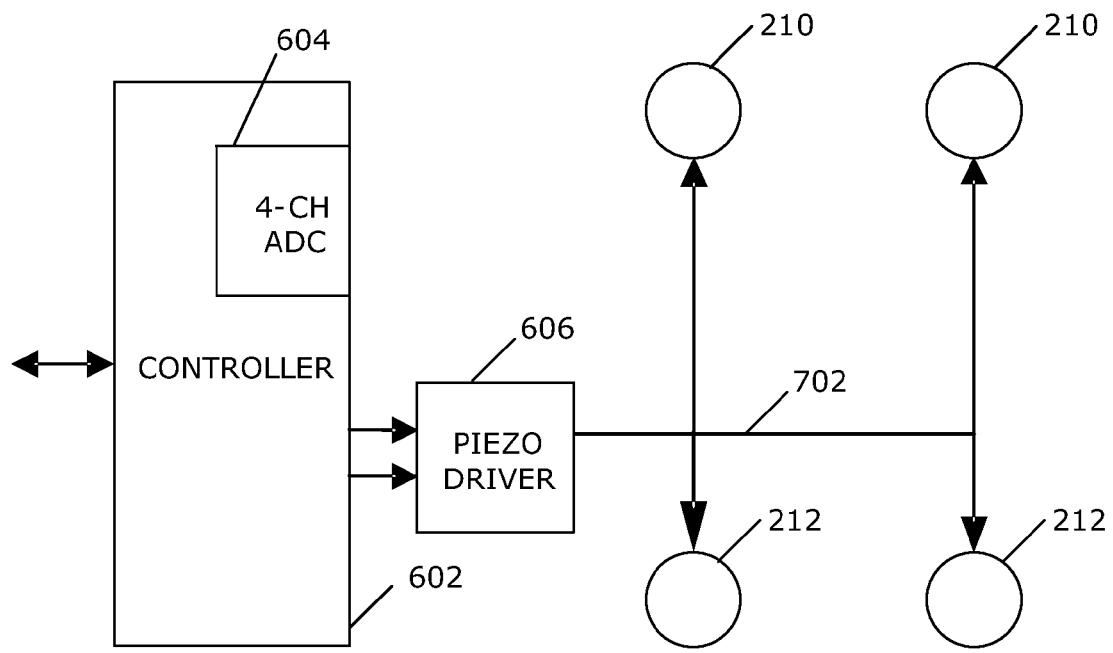
FIG. 7 and FIG. 8 together are an alternative example block diagram including actuators of the portable electronic device in accordance with the disclosure.

Reference is now made to FIG. 7 to describe an alternative example block diagram illustrating connection of the piezo actuators 210, 212. In the example of FIG. 7, all four piezo actuators 210, 212 are controlled by connection on a high voltage side to a common control line 702. Force sensors may be included but are not shown in FIG. 7 for the purpose of clarity of illustration.

Figure 8:
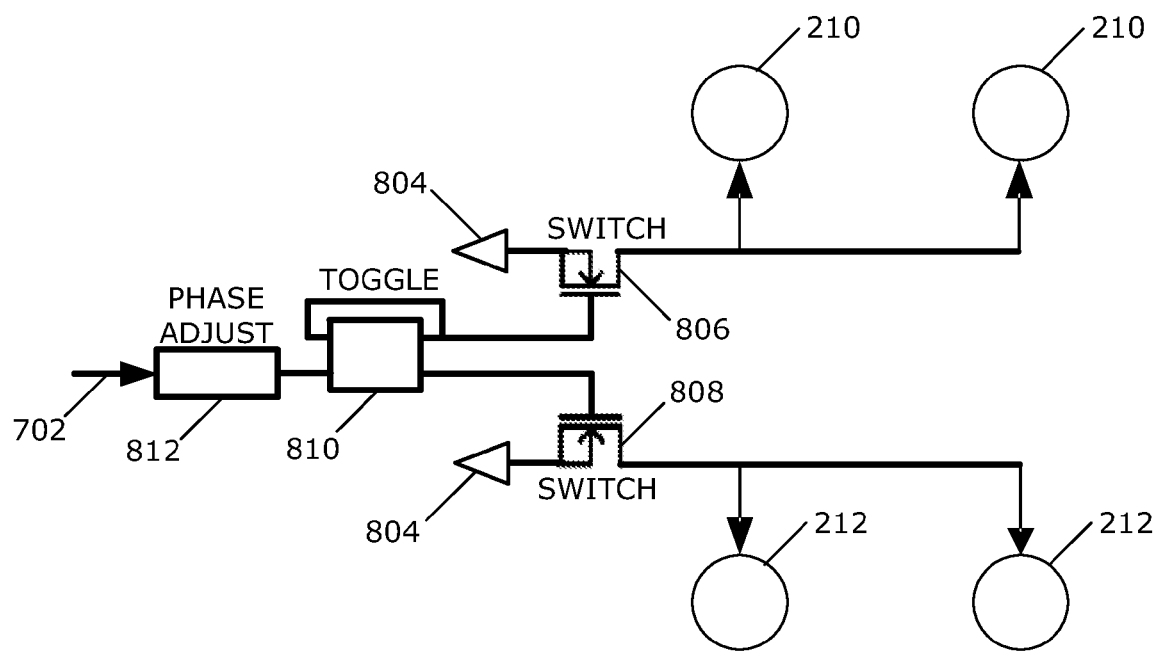

On the low voltage side, however, the connection to ground is controlled, as shown in FIG. 8. FIG. 8 illustrates control of the connection to ground in which the piezo actuators 210 near the first end 206 of the touch-sensitive display 118 are connected to ground 804 through a switch 806, such as a MOSFET (metal-oxide-semiconductor field-effect transistor). The piezo actuators 212 near the second end 208 of the touch-sensitive display 118 are connected to ground 804 through as switch 808, such as a MOSFET. The switches 806, 808 are alternately switched through the use of a toggle 810, or flip-flop. The toggle 810 is coupled to the piezo driver 606 which is connected to the controller 602, via a phase adjust 812 coupled to the common control line 702. The switches 806, 808 are alternately toggled upon change in voltage from low to high, or from high to low.

In the example shown in FIG. 7 and FIG. 8, the connection to ground is controlled to control the charge to the piezo actuators 210, 212. When the piezo actuators 210, 212 are not connected to ground 804, the charge at the piezo actuators 210, 212 does not build up with applied voltage. Thus, the charge is controlled by controlling the connection to ground. When the piezo actuators 210 are connected on the low side to ground 804, the piezo actuators 212 are not connected on the low side to ground 804. Similarly, when the piezo actuators 212 are connected on the low side to ground 804, the piezo actuators 210 are not connected on the low side to ground 804.

In the example illustrated in FIG. 7 and FIG. 8, the connection to ground is controlled to alternately actuate the piezo actuators 210 and the piezo actuators 212, thereby causing the touch-sensitive display 118 to pivot relative to the base 306 when a voltage waveform is applied. As described above, the touch-sensitive display 118 generally pivots about a centerline of the display, between the first end 206 and the second end 208, to cause vibration of the portable electronic device 100.

The actuators at one side of the touch-sensitive display may be controlled together and the actuators at the other side of the touch-sensitive display may be controlled together to cause rocking of the touch-sensitive display side to side rather than end to end. Further, each actuator may be controlled separately. Separately controlled actuators may be controlled to actuate in sequence in clockwise or counterclockwise direction, for example. Further still, movement of the touch-sensitive display 118 may be effected utilizing any suitable number of actuators. In other examples any number of actuators of two or more are utilized to effect movement of the touch-sensitive display.

According to one aspect, an electronic device includes a base, a touch-sensitive display moveable relative to the base, piezo actuators disposed between the base and the touch-sensitive display, the piezo actuators including a first piezo actuator and a second piezo actuator spaced from the first piezo actuator, and a controller configured to control the piezo actuators to alternately actuate the first piezo actuator and the second piezo actuator and apply forces to the touch-sensitive display, thereby causing the touch-sensitive display to pivot relative to the base.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. An electronic device comprising:
   a base;
   a touch-sensitive display moveable relative to the base;
   a frame coupled to the base and framing the touch-sensitive display such that the touch-sensitive display is disposed between a portion of the frame and the base;
   piezo actuators disposed between the base and the touch-sensitive display, the piezo actuators including a first piezo actuator and a second piezo actuator spaced from the first piezo actuator such that the first piezo actuator is disposed on a first side of a centerline of the touch-sensitive display and the second piezo actuator is disposed on a second side of the centerline of the touch-sensitive display, wherein the first side is opposite the second side;
   a biasing element disposed between the frame and the touch-sensitive display to bias the touch-sensitive display away from the frame and toward the base;
   a controller configured to control the piezo actuators to alternately actuate the first piezo actuator and the second piezo actuator to alternately apply forces to the first side of the touch-sensitive display and to the second side of the touch-sensitive display in a direction away from the base, opposing the bias by the biasing element, by charging the first piezo actuator while discharging the second piezo actuator followed by discharging the first piezo actuator while charging the second piezo actuator, thereby causing the touch-sensitive display to pivot relative to the base, and causing vibration of the portable electronic device.

2. The electronic device according to claim 1, wherein the actuation of the first piezo actuator and the second piezo actuator causes rocking of the touch-sensitive display.

3. The electronic device according to claim 1, wherein the first piezo actuator and the second piezo actuator are driven out of phase to alternately apply a force on the touch-sensitive display, away from the base.

4. The electronic device according to claim 1, wherein the piezo actuators include a third piezo actuator and a fourth piezo actuator.

5. The electronic device according to claim 4, wherein each of the first, second, third, and fourth piezo actuators is disposed near a respective corner of the touch-sensitive display.

6. The electronic device according to claim 5, wherein the first piezo actuator and the third piezo actuator are actuated together and wherein the second piezo actuator and the fourth piezo actuator are actuated together.

7. The electronic device according to claim 1, wherein the piezo actuators are actuated to provide tactile feedback.

\* \* \* \* \*